US009063587B2

(12) United States Patent
Boldin

(10) Patent No.: US 9,063,587 B2
(45) Date of Patent: Jun. 23, 2015

(54) COMPUTER INPUT DEVICE WITH ERGONOMICALLY FORMED AND POSITIONED ACTUATORS

(76) Inventor: Alexander Boldin, Kempten (DE)

( * ) Notice: Subject to any disclaimer, the term of this patent is extended or adjusted under 35 U.S.C. 154(b) by 1428 days.

(21) Appl. No.: 10/527,241

(22) PCT Filed: Sep. 10, 2003

(86) PCT No.: PCT/IB03/03867
§ 371 (c)(1),
(2), (4) Date: Mar. 8, 2005

(87) PCT Pub. No.: WO2004/025447
PCT Pub. Date: Mar. 25, 2004

(65) Prior Publication Data
US 2006/0033714 A1    Feb. 16, 2006

(30) Foreign Application Priority Data

Sep. 11, 2002  (DE) .................... 202 14 045

(51) Int. Cl.
G06F 3/033    (2013.01)
G06F 3/0354    (2013.01)
(52) U.S. Cl.
CPC .... *G06F 3/03543* (2013.01); *G06F 2203/0333* (2013.01)
(58) Field of Classification Search
USPC ................................. 345/163, 184
See application file for complete search history.

(56) References Cited

U.S. PATENT DOCUMENTS

| 4,913,573 | A | * | 4/1990 | Retter | 400/489 |
| 5,270,709 | A | * | 12/1993 | Niklsbacher | 341/20 |
| 6,256,015 | B1 | * | 7/2001 | Adler | 345/163 |
| 6,348,912 | B1 | * | 2/2002 | Smith | 345/163 |

FOREIGN PATENT DOCUMENTS

| JP | 8-234903 | 9/1996 |
| WO | WO99/60556 | 11/1999 |
| WO | WO/00/60536 | 10/2000 |
| WO | WO 00/60536 | 10/2000 |

* cited by examiner

*Primary Examiner* — Dennis Joseph
(74) *Attorney, Agent, or Firm* — Alix, Yale & Ristas, LLP

(57) ABSTRACT

Disclosed an ergonomically improved computer mouse provides several advantageous features and is different in several respects from prior mice. A mouse (100) has an upper casing (101) and a bottom part (102) with spacings, which provide sufficient clearance between upper and rear surfaces of the mouse, and the user's fingers and their hand plane when their hand rests on a working surface in a naturally relaxed curled fingers and hand position while at the same time, their index and middle fingertips are placed in respective moulds or receptacles (117) and (118), which are formed on the upper surfaces of a primary button (105) and a secondary button (106). A wheel button (123) is placed between the moulds. The mouse also provides two additional buttons (129) and (130) positioned rearward of the primary and secondary buttons, respectively, so as to be capable of being actuated by bending the user's index or middle finger positioned in the respective receptacles and simultaneous pinching the mouse between a user's thumb and a user's ring and/or little fingertips. The button placements, their unique shape, and the form of the mouse combine to provide ergonomic benefits such as using high settings for cursor speed and acceleration with simultaneous enhanced positional control of the cursor placement on the screen.

3 Claims, 9 Drawing Sheets

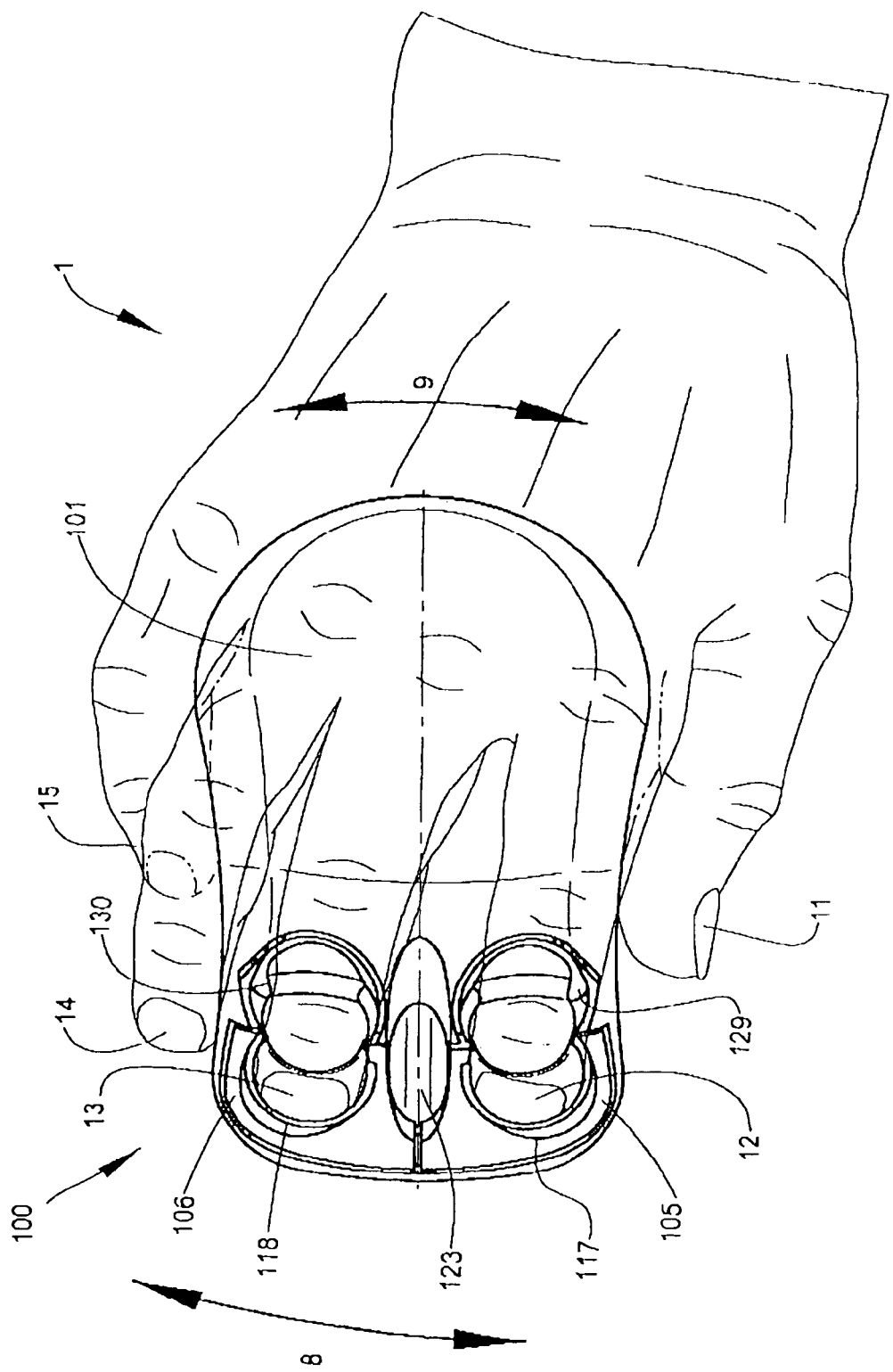

FIG. 4-A
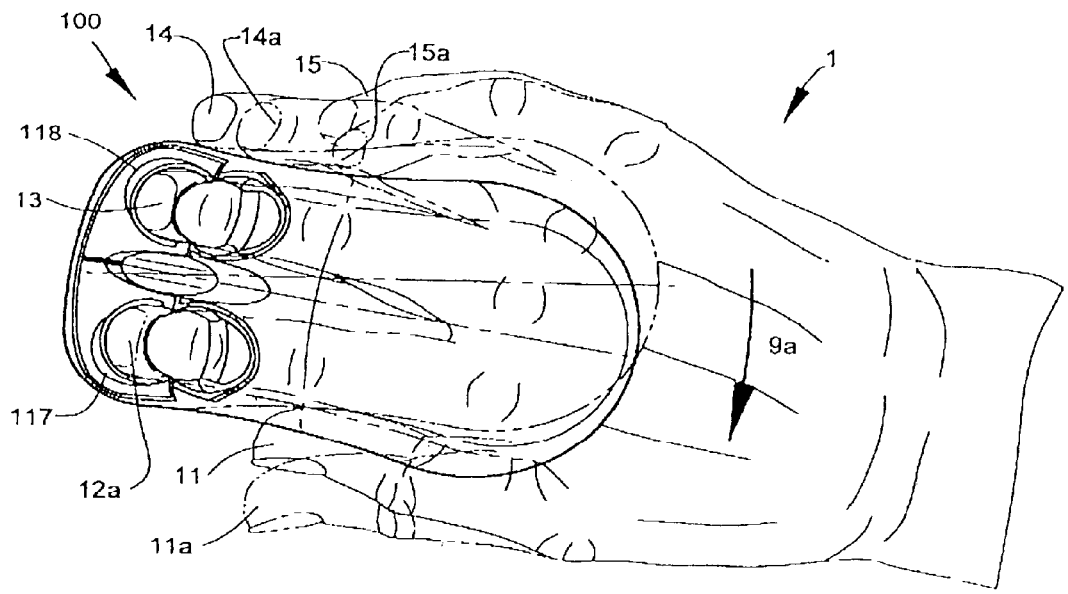
FIG. 4-B
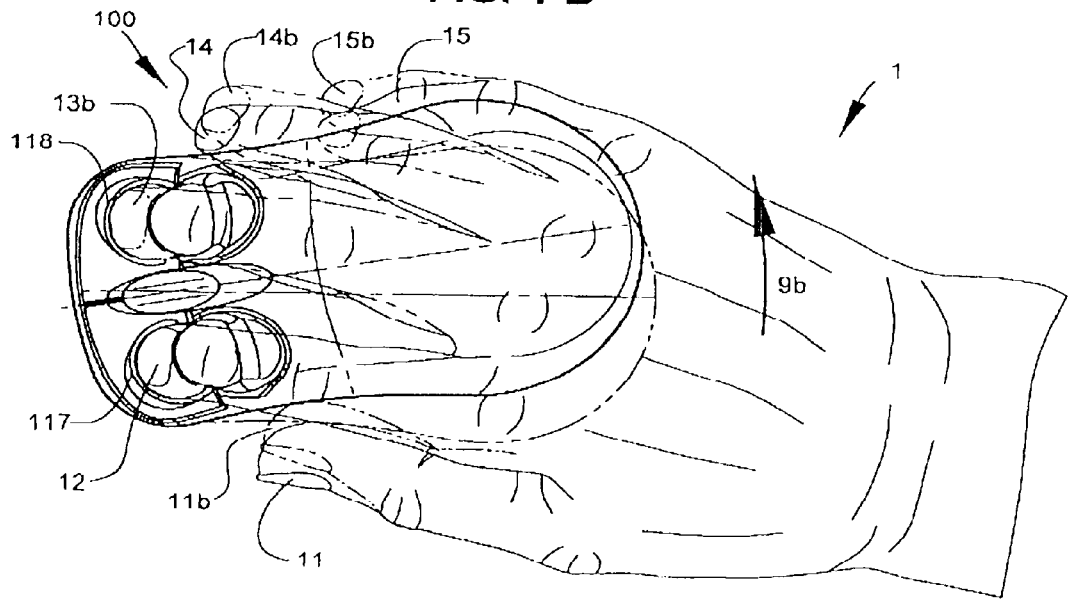

COMPUTER INPUT DEVICE WITH ERGONOMICALLY FORMED AND POSITIONED ACTUATORS

BACKGROUND OF THE INVENTION

The present invention relates to computer input devices. In particular, the present invention relates to computer mice. A computer mouse, as a tool for interacting with a computer has two basic functions, which may be defined as follows:
a) localizing a point/area/object on a screen of the output device in a visual form such as a cursor, a pointer or the like by manually moving a mouse with a mouse movement sensing system for providing mouse movement signals; and
b) producing control signals at the point/area/object on the screen by depressing a button coupled to the mouse with the user's finger, and, correspondingly, closing a respective control switch connected to the button thereby actuating commands in accordance with the program module/application.

It will be appreciated by those skilled in the art that various mouse movement sensing system alternatives are well known and available, such as mice with optical sensors for sensing mouse movements relative to the working surface, as well as, mice with conventional rotatable ball mouse movement signal generators. The graphic user interface (GUI) functions of a mouse, the electronic components and the hardware and software interface between a manually operated computer mouse and various connecting PC's and/or other computer systems are well known. Likewise, the internal circuitry of the mouse may also be of various known or conventional types.

The present invention relates to computer input devices for entering commands into a computer, based on the location of the cursor, which can be placed and actuated on the screen by moving an input device across a working surface and actuating buttons, and more particularly, to an ergonomically improved mouse. Some background concepts based on unproven ergonomic criteria, such as providing the support for a user's hand plane to reduce the loads on large muscle groups of the user's arm and shoulder have initially determined the evolution of the form of mice. For example, Microsoft Co. has disclosed in EP 0 591 961 A1 the form of the pointing device, which "allows users to position the lower palm on a work surface, such that the hand plane is supported by the pointing device, and to rest the fingers in a neutral posture to control the keys without having to compress or reach." Thereby, the finger's "neutral posture" is provided. However, large muscle groups of the user's arm and shoulder are automatically involved in hand-mouse movements while fine motor activity (agility) of user's fingers, especially an index finger and a middle finger, is limited in moving mouse. In the publication WO 00/60536, the concept is developed further wherein: "A mouse has sufficient width to support the distal phalanges of a user's ring finger and little finger".

Despite the fact that, localizing a point/area/object on the computer display, i.e., moving a mouse, is the primary action, which demands much more skillfulness and concentration from a user, prior mouse designs are dictated by the secondary action, i.e., depressing a mouse button. However, in practice, a user unconsciously or intuitively tries to use the fine motor activity of the fingers, in particularly, the thumb and the ring or little finger, for pinching the mouse in order to shift the same forward and backward by stretching or flexing the fingers, and correspondingly, to move cursor on the screen in the vertical direction. Even for horizontal cursor movement, the same fingers may be used for turning the mouse around the vertical axis, thereby providing movement of the incorporated track ball or optical sensor to the right or to the left. The last trend shows that manufactures have recently begun to shape mice in forms, which are adapted for ergonomically gripping the mouse between the thumb and ring or little fingers, whereby the thumb and ring or little finger are used for shifting the mouse forward and backward by stretching or flexing the same fingers.

The growing size of computer displays and saturation of modern computer applications with toolbars, which are usually placed on edges of the screen frame, force a user to operations with the mouse like scrolling. That is, during operations by achieving maximum radial or ulnar wrist deviation the user must lift up the mouse above the working surface in order to freeze the pointer position on the screen while deviating the wrist back into neutral position and then drop the mouse onto the working surface to carry on moving the pointer further. Note that radial deviation is wrist rotation toward the thumb and ulnar deviation is wrist rotation toward the little finger. The software developed for mouse operations with high settings for pointer movement and its acceleration, when the mouse is moved faster, which might reduce the above mentioned type of operations, remains useless and mostly could be used at standard, low range settings because the user has significant difficulties in fine positioning of the pointer at high range above the mentioned settings when the mouse is operated by wrist and/or arm motions. A revolutionary new optical sensor for measuring even the smallest mouse movement cannot give the user much more accuracy and control in positioning cursor on the screen if, as before, the mouse would be operated by user wrist/arm movements.

By way of further background, a reported cause of carpal tunnel syndrome is improper use of a computer mouse. With a conventional such mouse the users can develop bad habits that may predispose them to development or aggravation of carpal tunnel syndrome. These bad habits can include using excessive wrist angles to position the mouse instead of using the user's fingers, such as placing the wrist flat on the desk surface with the wrist bent back at an angle greater than fifteen degrees, and pronation (inward rotation) of the wrist past a normal angle with fingers spread to reach around mouse body and then gripping the mouse tightly with the hand in any of those positions. Finger motion (clicking) is believed to potentially irritate the tissues and nerves in the carpal tunnel. Indiscriminate use of wrist or arm braces can exacerbate the effects.

Publication WO 01/01335 A1 discloses using the middle and the ring fingers to push the mouse forward, when stretched against a well that is arranged in the front part of the mouse. The form of the mouse and the well, and positioning of the buttons provide the positioning of the user's fingers on the mouse as follows: "During operations, the thumb is placed in the indentation on the left side of the mouse, the index finger along the push-button on the top ridge, the third and fourth fingers in the well and fifth finger along the right side, in touch with the working surface." By this positioning of the user's fingers, the weight of the user's hand is automatically loaded on the mouse and pushing the mouse by merely stretching two fingers seems to not be ergonomically relevant.

Operating a mouse in the way described in U.S. Pat. No. 6,034,627 as: "by using merely fingers without adapting to the size and shape of a human's palm" by means of a through hole formed on the housing in which an index finger is accommodated" forces a user in any case to grip or squeez the mouse likewise, such as a pencil grip. However, by using the pencil grip, the user will position the mouse using the forearm and arm for gross positioning and the fingers and wrist for fine motion. The user will thus move the mouse with shoulder and forearm muscles for gross X-Y coordinate GUI pointer positioning. Note that all these operations are associated with permanent gripping efforts of the user's fingers.

Today, to use a modern computer system more efficiently, a user needs a mouse with more than two or three buttons; these types of mice are now mostly in practice. There are numerous new types of mice with additional buttons, which are capable of actuation by a user's thumb or a ring finger on the market. However, operating this type of mice demands from a user more concentration and coordination. thus, they are uncomfortable or difficult to use, especially for relatively long period of time.

There is a shortcoming of existing products. Thus, an improved mouse is needed that is more comfortable and easier to use, that will minimize any fatigue experienced by a user while allowing for moving mouse with using the fine motor activity of the fingers of the user, especially the index and middle fingers, and that has additional buttons, which can be actuated with the same fingers. In contrast, the disclosed embodiment of a new mouse design in the example below induces a more natural and better hand and wrist position, provides easy and natural operation, discourages severe wrist deviation and forearm and arm motions, and encourages good hand and finger movement habits.

SUMMARY OF THE INVENTION

Disclosed in the embodiment herein is an improved computer mouse providing several advantageous features and differing in several respects from the above-cited prior references. A mouse has an upper casing and a bottom part with spacings, which provide sufficient clearance between upper and rear surfaces of the mouse, and the user's fingers and the user's hand plane when the user's hand rests on a working surface in a naturally relaxed curled fingers and hand position while at the same time, the distal phalanxes of the user's index and middle fingers are placed in respective moulds or receptacles. The moulds are formed on the upper surfaces of a primary button and a secondary button that are coupled to the front part of the upper casing. A gap between the user's index finger and the middle finger is natural, to allow placement of a wheel button between the moulds.

The mouse has width dimensions, which allow the mouse to fit between distal phalanxes of the user's ring and little fingers, and a distal phalanx of the user's thumb when a user's low palm, user's ring and little fingertips, and a side of the distal phalanx of the user's thumb are resting on the working surface without gripping anything in the naturally relaxed curled fingers and hand position. Both sides of the mouse in contact areas with the distal phalanx of the user's thumb and the distal phalanxes of the user's ring and little finger are substantially vertical to provide a secure grip, which allows a user to lift, if desired, the mouse up by a natural grasping the same with the thumb and the ring or/and little finger. The user's thumb, user's ring, and little fingertip pinching areas are concave. The length of the rear part of the mouse, measured from the front edge of the mould-formed contact areas of the primary and secondary buttons, is chosen so as to provide sufficient clearance between the rear surface of the mouse and a user's palm whereby providing that from the naturally relaxed curled finger and hand position so that the mouse can be moved by flexing the user's index and middle finger further in the pocket formed by the relaxed curled hand.

An inside form of the mould forms a receptacle, which is substantially conformed to the shape of a fingertip, thereby providing a secure contact of a user's finger with the mouse and enabling a user to shift the mouse in any direction on the working surface without the need to grip or pinch the mouse with other fingers. In order to reduce deflection of the position of the user's index finger and middle finger from the naturally relaxed curled fingers position, when resting on the working surface without grasping anything, the user's index and middle fingertips, being placed in the respective moulds, are elevated from the working surface at a height, which is minimized and substantially defined by an outside diameter of the wheel button and a position of the wheel relative to the moulds along the longitudinal axis of the mouse. In addition, the mould-formed contact areas of the primary and the secondary buttons encourage the user to actuate the primary and the secondary buttons in a biomechanically convenient way, by stretching the user's index or middle finger, respectively, in the combined down-forward motion, which can be described as similar to stroking, tangential to, a conventional formed upper surface of the mouse button.

The mouse also provides at least one additional button positioned rearward of the primary or secondary button so that both buttons together form a shaped button assembly that substantially conforms to the form of the distal phalange of the index or the middle finger, respectively. The form and construction of an additional button provides for actuating the additional button only by flexing a user's index or middle finger with simultaneous pinching of the mouse between the thumb and the ring and/or little fingertip.

All of the designed features noted above work together to provide an ergonomically improved mouse design, which allows the user to operate the mouse by using natural agility of the human fingers. The button placements, their unique shape, and the form of the mouse combine to provide ergonomic benefits such as using high settings for cursor speed and acceleration with simultaneous enhanced positional control of the cursor placement on the screen. The embodiment of a new mouse button design allows the user to actuate the buttons by using only the index and/or middle fingers. Alternatively, this disclosed computer mouse embodiment can provide the user with the ability to control the mouse in more than one way so that alternate hand and fingers motions can be used to relieve discomfort, if desired.

BRIEF DESCRIPTION OF THE DRAWINGS

FIG. 4 shows a top view of the present invention with a superimposed hand shown in a neutral posture.

FIG. 4-A shows a top view of the present invention with a superimposed hand shown turning the mouse to the left by a ring finger move.

FIG. 4-B shows a top view of the present invention with a superimposed hand shown turning the mouse to the right by a thumb move.

DETAILED DESCRIPTION OF THE INVENTION

In order to understand more fully the present invention, it is helpful to define the art and sequences of the user's fingers-, wrist-, and arm-motions, and an optimal posture of the user's hand and fingers on the working surface when operating a mouse. It can be readily determined that with the low palm, fingertips, and the side of the distal phalanx of the thumb resting on the working surface without grasping anything, the fingers are not contracted at all, but are naturally curled in the relaxed, rest-position; what is more, the index fingertip seems to be slightly elevated in this position.

The user's ability to coordinate the fingers motions and the functional agility of the human fingers, as well as the rational combination of the fingers, wrist, and arm motions in operating a mouse are the decisive criteria chosen for the embodiments of the present invention.

It is an object of this invention to provide a form of the mouse, which is shaped to fit within the pocket formed by a user's hand when it rests on a working surface without grasping anything in a naturally relaxed curled fingers and hand position. The form of the mouse provides sufficient clearance between the upper and rear surfaces of the mouse, and the user's fingers and the user's hand plane, wherein only the distal phalanxes of the user's index and the middle fingers are supported by the mouse through mould-formed contact areas. The moulds form fingertip receptacles on the upper surfaces of a primary button and a secondary button. The buttons are coupled to the front part of the upper casing of the mouse.

An important observation can be made by closely considering the art describing the finger motion when actuating buttons of prior mice. Typing with fingers on the typewriter initially inspired the way of actuating prior mouse buttons by user's fingers. Depressing a button with the nearly straight finger is not an optimal, natural finger motion. Compressing and reaching or grasping and stretching are natural motions for human fingers. However, compressing or reaching the finger, being placed over a conventional mouse button, would appear similar to stroking the surface of the button without actuating the same.

In contrast, by stretching a user's finger placed in the mould or receptacle of the embodiment of a new mouse button design, in a combined down-forward motion, the button will be actuated to close a switch connected to the button. These features provide high positional control using the small muscles of the fingers whose ligaments do not pass through the carpal tunnel. The button placements, their unique shape, and the form of the mouse combine to provide ergonomic benefits, as will be further discussed.

Figure 1:
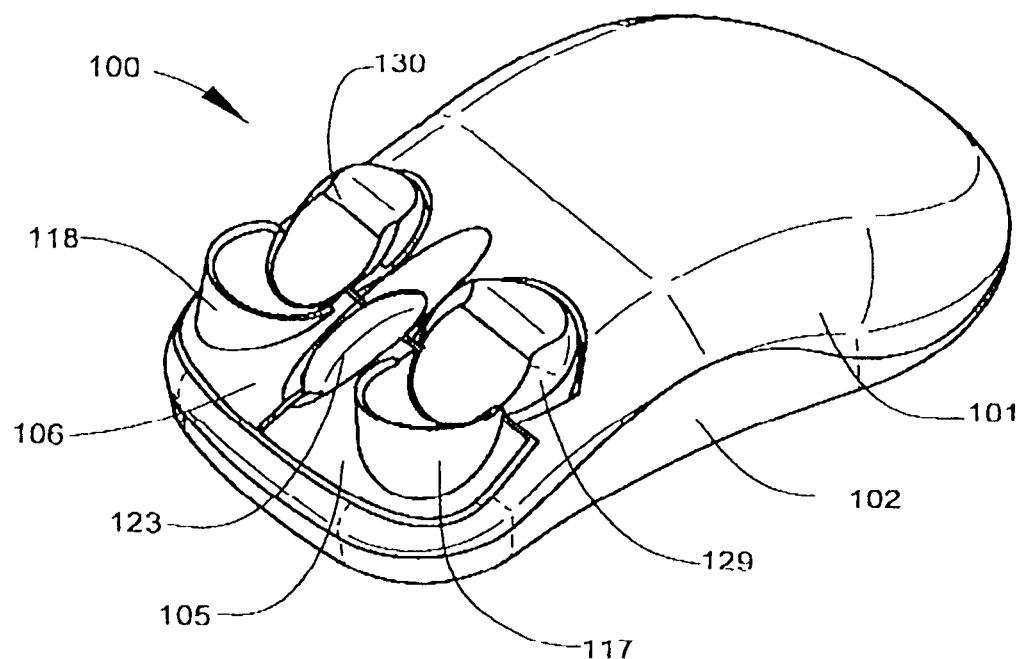
FIG. 1 shows a perspective view of a mouse of the present invention.
Figure 2:
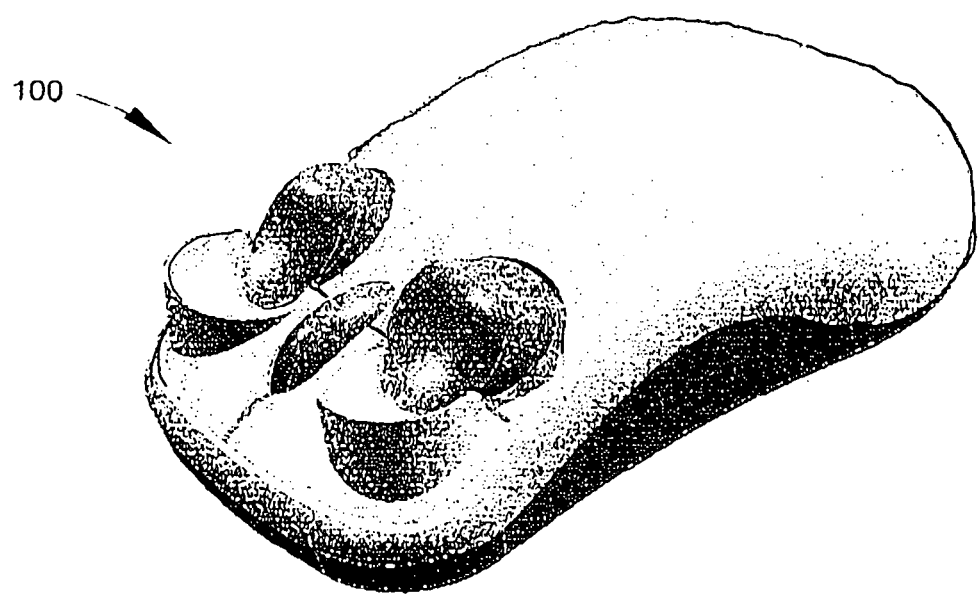
FIG. 2 shows a perspective-shaded picture of a mouse of the present invention.
Figure 9:
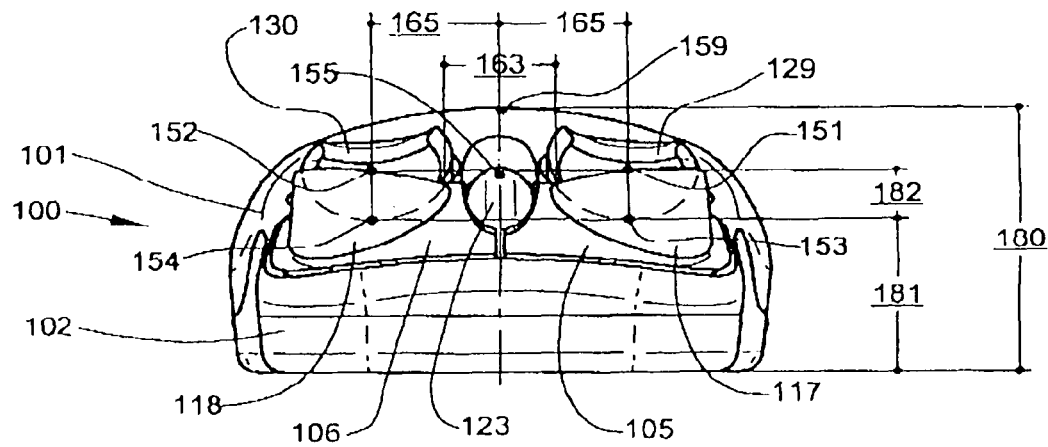
FIG. 9 shows a front view, partly in phantom and partly in diagrammatic form of a mouse of the present invention.
Figure 10:
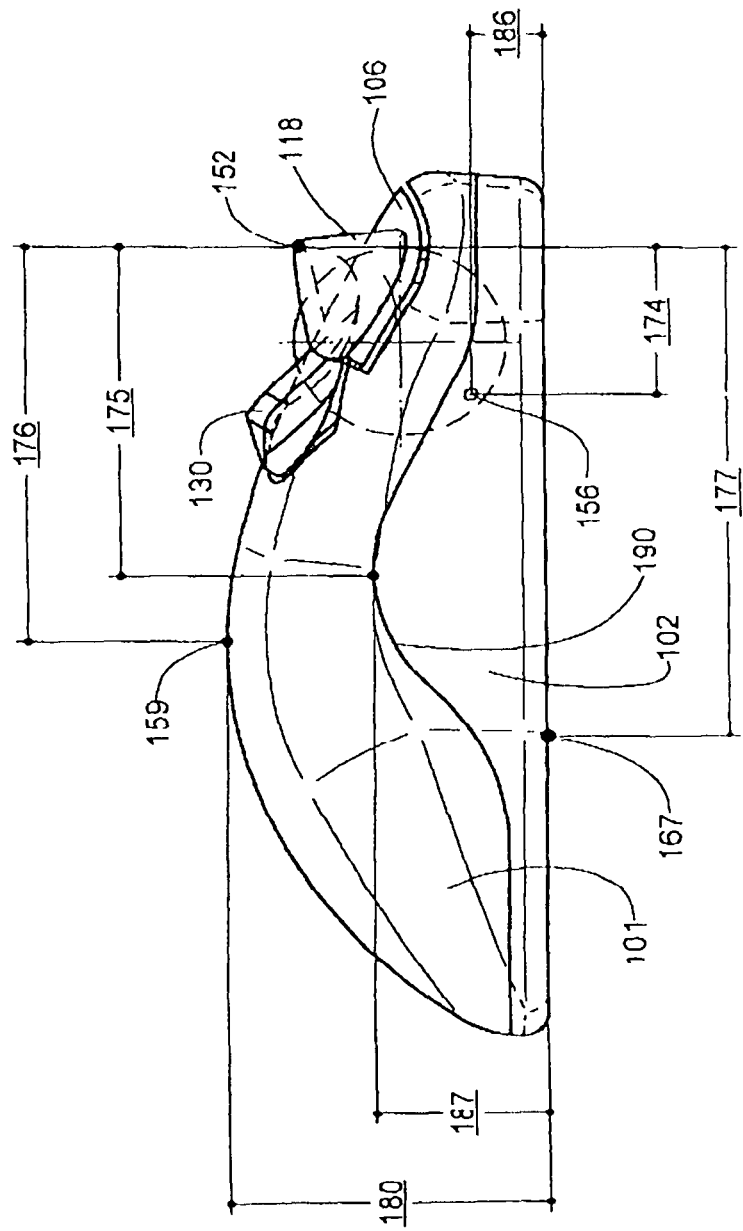
FIG. 10 shows a side view, partly in phantom and partly in diagrammatic form of a mouse of the present invention.
Figure 11:
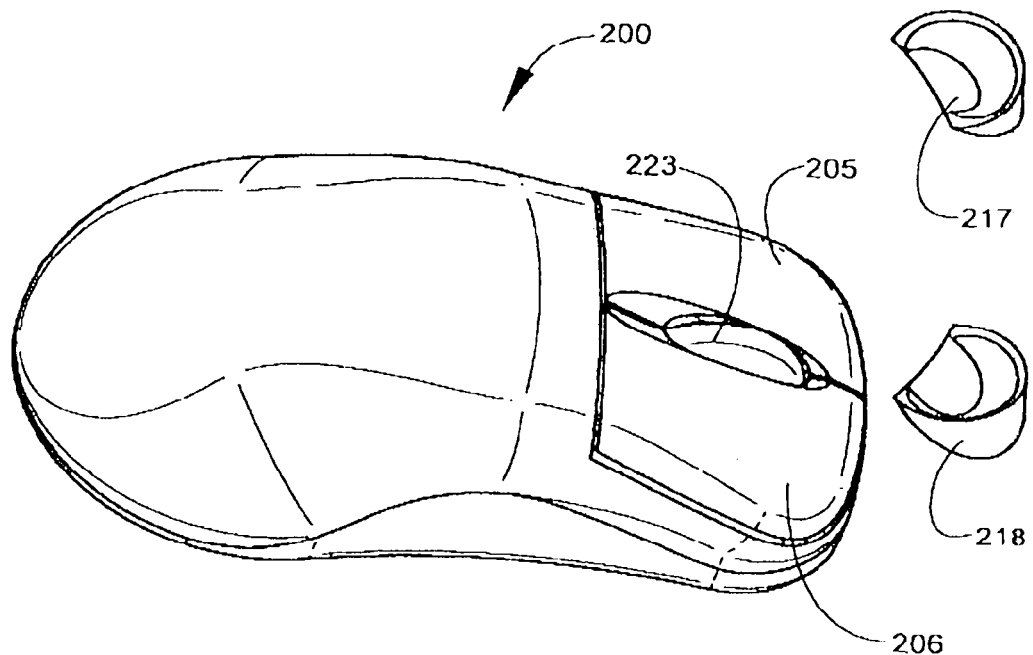
FIG. 11 shows a perspective explosive view of a conventional mouse and moulds in accordance with the present invention.
Figure 12:
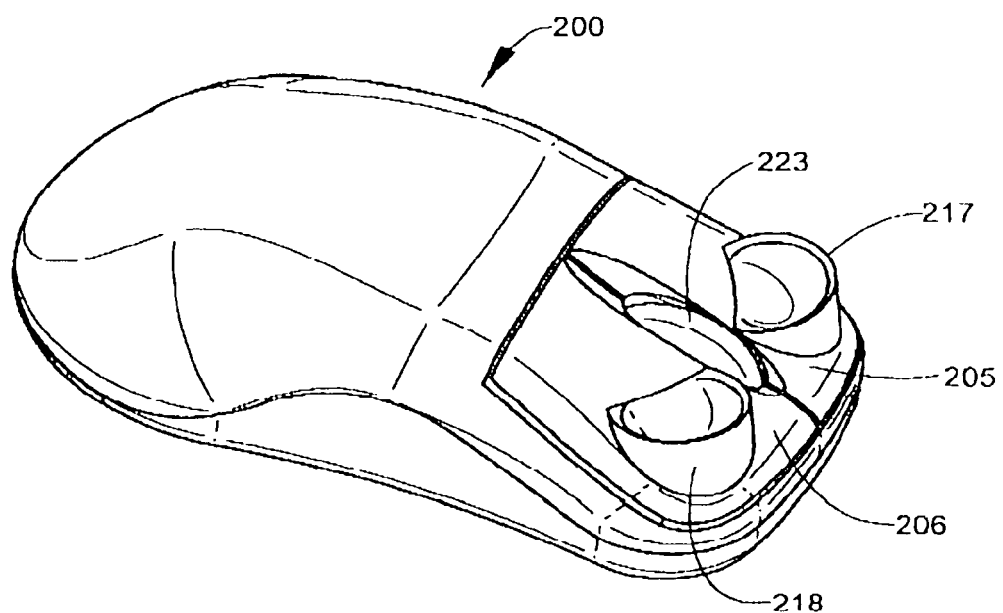
FIG. 12 shows a perspective view of a conventional mouse with moulds mounted on the upper surfaces of the primary and secondary buttons.

In embodiments of the present invention, a pointing device is a mouse, such as mouse 100 of FIGS. 1 through 10, and such as mouse 200 of FIGS. 11, 12. FIG. 1 provides a perspective view of mouse 100. In FIG. 1, mouse 100 includes an upper casing 101 and a bottom part 102. To a front part of the upper casing 101 are coupled a primary button 105, with an additional button 129 positioned rearward of the primary button, and a secondary button 106, with an additional button 130 positioned rearward of the secondary button.

A key feature of present invention is the presence of moulds 117 and 118, which form fingertip receptacles on the upper surface of the primary and secondary button, respectively. The inside of the moulds, 117 and 118, indicated above as a mould-formed contact area with a user's fingertip, are formed to substantially conform to a shape of the user's index and middle fingertips, respectively, thereby providing secure contact with the mouse for the user's fingertips, so that the user is able to control positioning of the mouse by shifting the same in any direction on the working surface without the need to grip or pinch the mouse with other fingers. Thus, flexors and extensors of the user's hand are in equilibrium, and static loads on forearm muscles associated with gripping objects are minimized.

Figure 3:
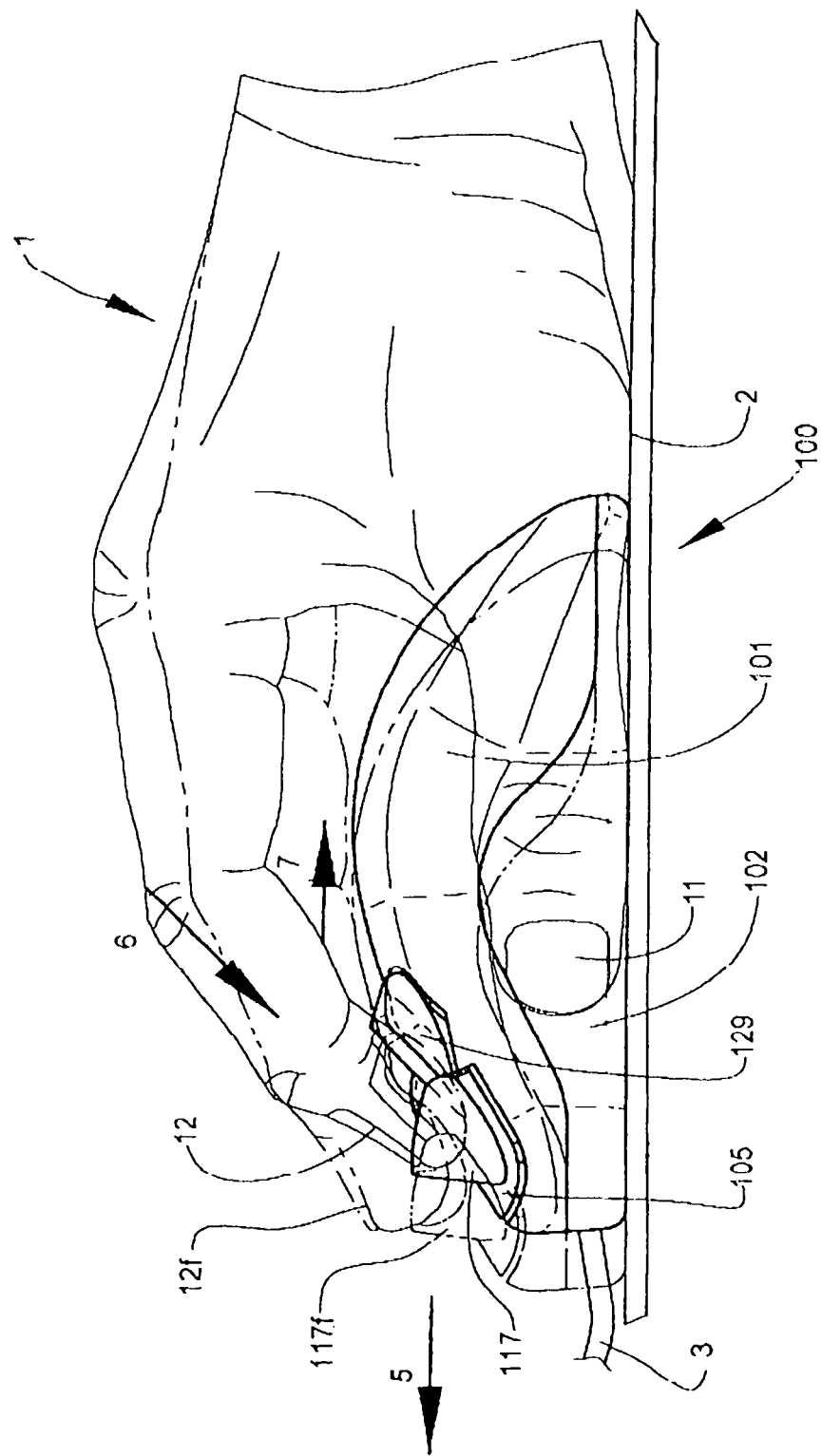
FIG. 3 shows a side view of a mouse of the present invention with a superimposed hand shown in a neutral posture on a work surface.

FIG. 3 provides a side view of mouse 100 with a user's hand 1 superimposed over the mouse to show the general alignment of the mouse's features with the user's hand. FIG. 4 provides a top view of mouse 100 also with a user's hand 1 superimposed over the mouse. In FIGS. 3, and 4, hand 1 with mouse 100 is shown in a neutral posture on a working surface 2. The neutral posture of the user's hand means that the user's low palm, the side of the distal phalanx of the thumb, the ring-fingertip, and the little-fingertip are resting on the working surface without gripping the mouse, and only the user's index fingertip and the middle fingertip are supported by the mouse by being placed on the mould-formed contact areas of the primary button 105 and secondary button 106, respectively. Note that all fingers are naturally flexed and a gap between the user's index and middle fingers is natural, which allows positioning a wheel button 123 between the moulds 117 and 118.

As best seen in FIG. 3, a height of the mouse 100 is chosen to provide sufficient clearance between the upper surface of the rear part of the upper casing 101 and the user's fingers, and the user's hand plane at the naturally curled posture of the user's index and middle fingers when they are in place on contact areas of the moulds 117 and 118, respectively. Thereby, the upper surface of the mouse 100 does not interfere with the user's index finger 12 and user's middle finger (not shown) in a position 12$f$ (shown by a dotted line) when shifting the mouse in position 117$f$ in direction indicated by arrow 5.

In order to reduce deflection of the position of the user's index finger and the middle finger from the naturally relaxed curled fingers position, when resting on the working surface without grasping anything, the user's index and middle fingertips, being placed in the respective moulds, are elevated from the working surface at a height, which is minimized and substantially defined by an outside diameter of the wheel button and a position of the wheel 123 relative to the moulds along the longitudinal axis of the mouse. Thus, this positioning of the user's index and the middle fingers on the mouse at the minimized height does not turn the user's hand, so that the user's hand is not in a highly pronated position.

The mouse 100 shape and size allow a user to wrap the hand around the mouse body in a relaxed position, which is described by ergonomists as a "power grip" and is a preferred ergonomic grip. Thus, as gripped between the user's thumb 11, and the ring finger 14, and little finger 15, the longitudinal axis of the mouse 100 is aligned with the axis of the user forearm by approximately 20 degrees (See FIG. 4). The chosen length of the rear part of the mouse 100 allows the user to move the mouse from the neutral posture of the user's index and middle fingers when they are in place on contact areas of the moulds 117 and 118, respectively, further in the direction indicated by arrow 7 of FIG. 3 by flexing the user's index and the user's middle fingers when operating the mouse.

The top view of FIG. 4 shows a form of the bottom part 102, which is fit between distal phalanxes of the user's ring and little fingers, and the distal phalanx of the thumb when the user's low palm, the little and ring fingertips and the side of the distal phalanx of the thumb are resting on the working surface without pinching the mouse in the naturally relaxed curled fingers and hand position.

In the preferred embodiments of the present invention, two separated moulds allow the user to control positioning of the longitudinal axis of the mouse 100 with precision during operations. Moving a cursor on the computer display in the horizontal direction can be achieved by shifting mouse 100 with wrist deviation indicated by double arrow 8 (See FIG. 4). Furthermore, moulds 117 and 118, and a form of the mouse 100 allow the user to turn the mouse 100 around a vertical axis in directions indicated by double arrow 9 of FIG. 4 without moving the wrist at all, thereby providing movement a cursor on the computer display in the horizontal direction. In FIG. 4-A mouse 100 is shown being turned leftward along an arrow 9a around a vertical axis passing through a mould 118 by flexing the user's ring finger 14 and/or little finger 15 in position 14a and 15a, respectively, shown by a dotted line, with the simultaneously coordinated extending of user's index finger 12 in position 12a and moving user's thumb 11 outward in position 11a while at the same time, the user's middle finger 13 remains relatively firm providing a point of pivoting on the front of the fingertip. Note that the user's thumb is slightly resistant to mouse movement during turning of the mouse.

Muscle movement in general requires moderation by another muscle. Using one body part to act as a resisting force to another enhances positional control. Moving a lever with two hands gives better control than moving it with one. This enhanced control is the result of a combination of physical forces and the synergistic affect of proprioceptive neurons of opposing body parts. In this context, turning the mouse body between the user's fingers looks like operating the mouse between the fingers, wherein the user's index or the middle finger, being placed in the respective mould acts as a pivot axis, and wherein the user's thumb lightly resists motions of other fingers to enhance positional control of the mouse. These features provide high positional control, using the small muscles of the fingers. Note that, during operations, all fingers are naturally relaxed and flexed whereby static loads on forearm muscles associated with gripping objects are minimized.

In FIG. 4-B mouse 100 is shown being turned rightward along an arrow 9b around a vertical axis passing through a mould 117 by flexing the user's thumb 11 in position 11b, shown by a dotted line, with simultaneous coordination of extending the user's middle finger 13 in position 13b while at the same time, the user's index finger 12 remains relatively firm providing a point of pivoting on the front of the fingertip. Note that the user's ring 14 or little finger 15 is slightly resistant during turning of the mouse,, and the little 15 or ring 14 finger remains relaxed in order to not interfere with the upper surface of casing 101. In fact, the user can turn mouse 100 around its vertical axis by merely flexing or extending the index finger with simultaneously extending or flexing, respectively, the middle finger.

Touching the fingertips on the working surface desirably connects the position of the users hand and the working surface through the tactile nerve endings of the fingertips and the proprioceptive (position sensing) neural receptors in muscles and joints. Without this tactile connection the position, direction, and speed of mouse movements relative to the screen pointer position is only through continuous visual feedback from the cursor on the display screen. The advantage of this tactile mouse movement connection is made possible by the presence of the moulds 117 and 118. Since the nerve-sensitive adjacent fingertip skin surfaces of the index and middle fingers are constantly touching the mouse moulds surface, the mental reference to the working surface connection becomes a point with a known orientation. This tactile reference to the mouse and the working surface and a learned relationship between fingers/hand motions and visual pointer movement can reduce the level of conscious discrimination needed when positioning the cursor to a screen point/area/object, and possibly reduce fatigue in long term mouse usage.

As mentioned above, working with modern applications, which are saturated with numerous toolbars normally placed on the screen frame edges, requires the user to repeatedly make the same operations such as leaving the operating area, i.e., moving the mouse and correspondingly the cursor to a toolbar, actuating a desired tool, and moving a cursor back to the operating area. The embodiment of an ergonomically improved mouse design disclosed herein allows the user to carry out such operations by using the natural agility of the fingers thereby allowing the user to operate the mouse with high settings for cursor speed and acceleration with simultaneous enhanced positional control of the cursor placement on the screen.

Figure 5:
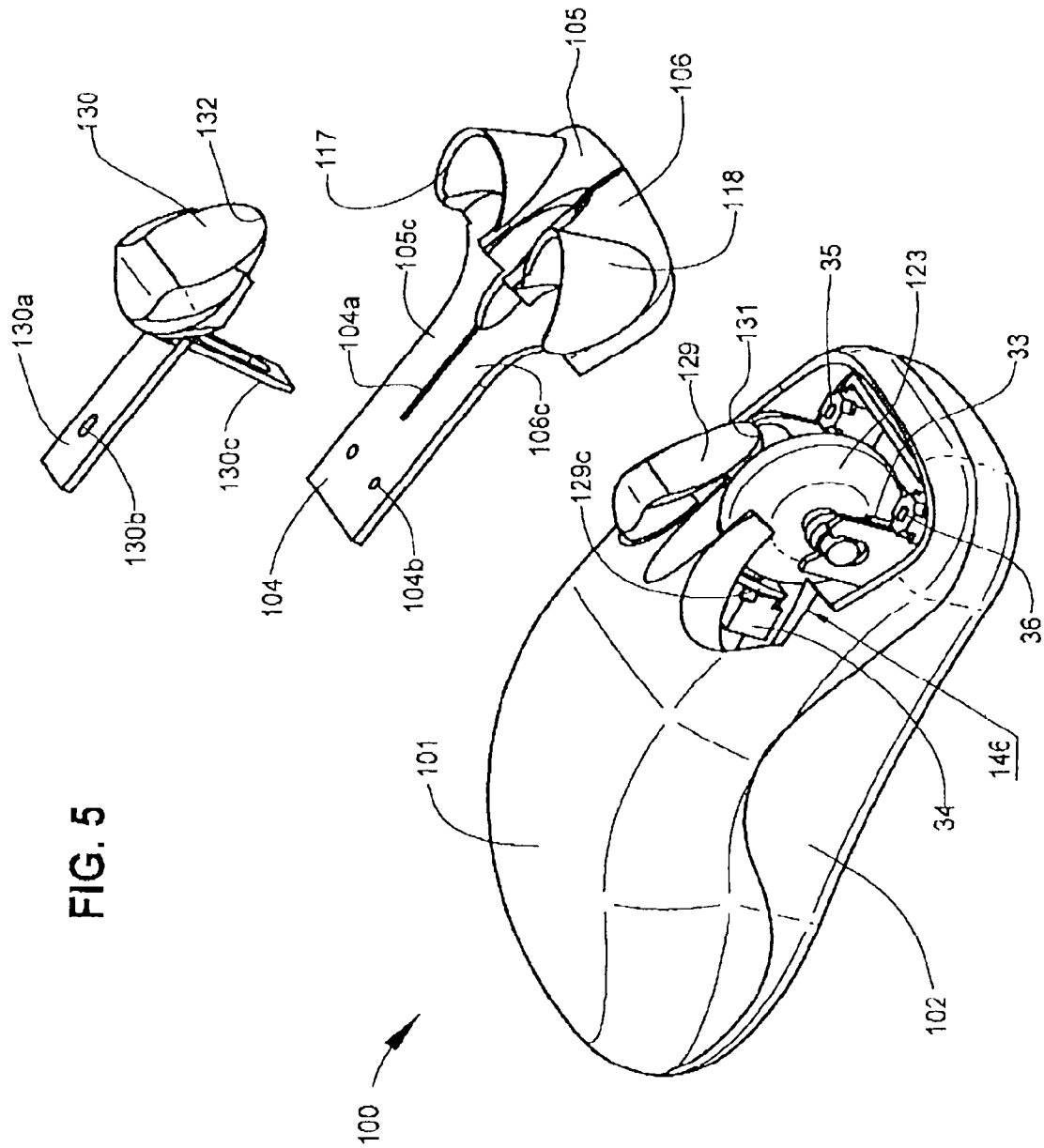
FIG. 5 shows an exploded perspective view of a mouse of the present invention.
Figure 6:
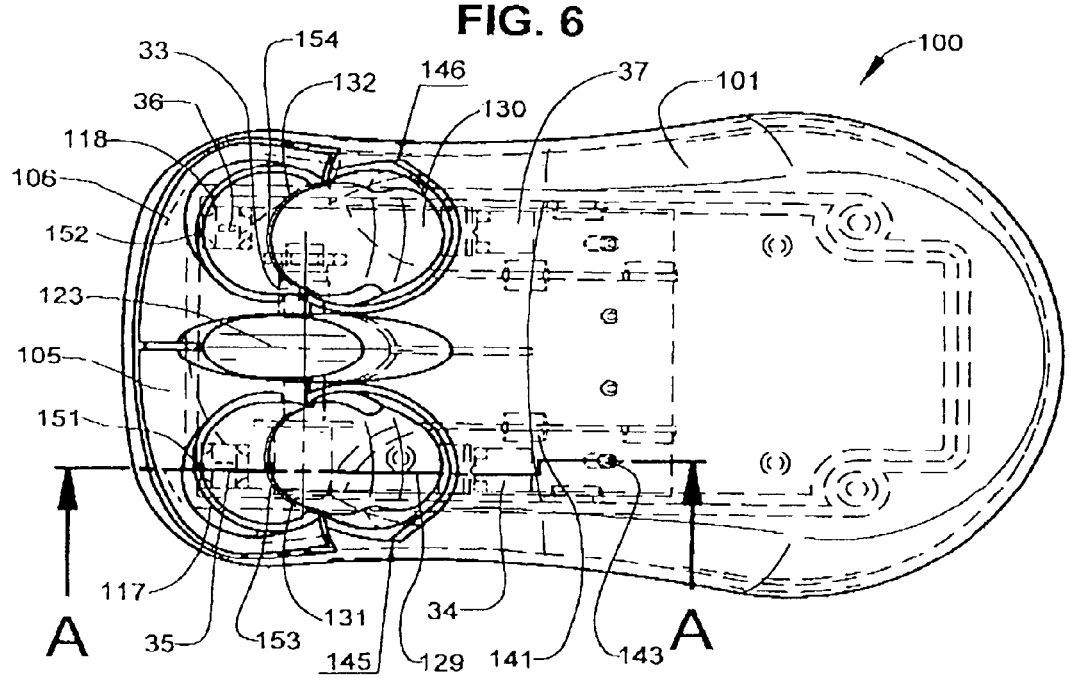
FIG. 6 shows a top view, partly in phantom form and partly in diagrammatic form, of a mouse of the present invention.
Figure 7:
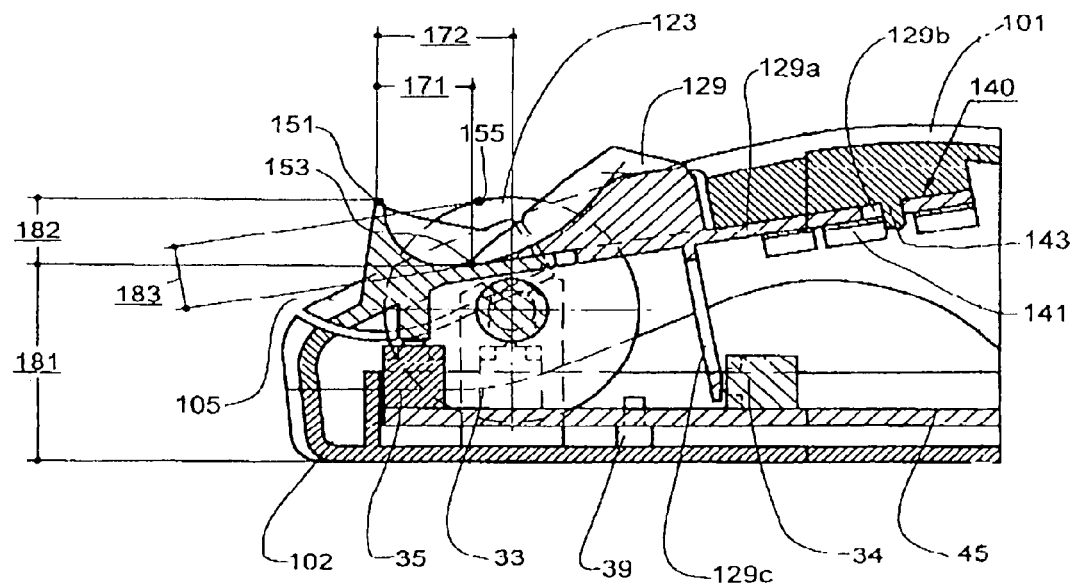
FIG. 7 shows an enlarged fragmentary cross-sectional view, partly in phantom and partly in diagrammatic form, of FIG. 6 taken along the line A-A.

FIGS. 5, 6, and 7 show the positioning and the construction of the buttons and some interior components of the mouse 100. As best seen in an explosive perspective view of FIG. 5, the primary button 105 and the secondary button 106 each are parts of the ends of the levers, which longitudinally extend from a common basis plate 104 with two slots 104b.

Cut 104a splits the buttons from one another at a sufficient length to form middle parts 105c and 106c of the buttons 105 and 106, respectively, which function as blade springs whereby the primary and secondary buttons are capable of being actuated when independently depressed and popping up when released. The primary button 105 and the secondary button 106 are capable of being actuated by a generally downward forward force applied by the user's index finger 12 and the middle finger 13 when stretching against the primary receptacle 117 and secondary receptacle 118, respectively. In FIGS. 6, and 7 it can also be seen that common basis plate 104 is clenched on a plate 140 of FIG. 7, between two wedging clamps or clips 141; and firmly fixed with two sprigs 143, which pass through two slots 104b. Switches 33, 35, and 36 are connected to a wheel button 123, a button 105, and button 106, respectively, and are closed when the button or the wheel is depressed. Note that the switches 33, 35, and 36 are mounted on a plate 45 in the vertical orientation, i.e. having a contact point at the top of the switch so as to be capable of closing the contact by a vertical movement of the button (See FIGS. 5, 6 and 7).

These or various other alternative suitable sensors and switches are well known per se and need not be described in further detail herein. Various IR or other wireless interfaces can of course, replace the connecting cable 3 of FIG. 3, as is well known. The mouse ball or other mouse movement sensing sensor (not shown in FIGS.) is positioned on the bottom part 102 rearwardly from primary and secondary receptacles along a central longitudinal axis of said casing. That is, as shown in FIG. 10, the point 167 indicates a position of the sensor of the mouse movement sensing system is near the user, rear edge of the casing.

All switches and a mouse movement sensing system (not shown) are mounted on a plate 45, which is fixed on stubs 39 of the bottom part 102. Additional buttons 129 and 130 are constructed and movably mounted on a plate 140 of the upper casing 101 (see FIG. 7) so as to be capable of being actuated by the user's index finger and the user's middle finger, respectively, when the user flexes the finger with simultaneous pinching of the mouse between the thumb and the ring finger and/or the little finger.

Additional buttons 129 and 130 have basis plate 129a and 130a with long slots 129b and 130b, respectively. Basis plates 129a and 130a are movably mounted on a plane 140 on both sides of the common basis plate 104 between three clamps or clips 141 while at the same time, the sprig 143, which is passing through the long slot, limits range of movement of the button. Planes 145 and 146 are arrange parallel to the plane 140 on the upper casing 101 to provide sufficient support for the additional buttons 129 and 130, respectively (See FIGS. 5, and 6). Thus, the additional buttons 129 and 130 freely slide on (or along) the planes 140, 145 and 146 when being actuated by the user's fingers.

Blade springs 129c and 130c are arranged perpendicularly to basis plates 129a and 130a, respectively, to connect the buttons 129 and 130 to respective switches 34 and 37, which are fixed on the plate 45. By means of blade springs 129c and 130c, the respective switches are closed when flexing the user's finger to move the buttons, and the buttons are shifted back when released. Note that the switches 34, and 37 are mounted on a plate 45 in the horizontal orientation, i.e. having a contact point at the side of the switch, so as to be capable of closing the contact by a horizontal movement of the button correspondingly the blade springs 129c and 130c. (See FIGS. 5, 6 and 7).

A mould-formed contact area of the primary or secondary button and a contact area of the additional button together form a shaped button assembly that substantially conforms to a shape of the distal phalange of the user's index or middle finger. The insides of the moulds 117 and 118 and an upper surface of the additional button 129 and 130 are formed to substantially conform to an interior portion of the distal phalange of the user's index finger and user's middle finger, respectively, whereby, the interior portion of the distal phalange of the index finger or the user's middle finger contacts a portion of the upper surface of the additional button when the user's index finger or the user's middle fingertip is placed on the respective mould-formed contact area.

The mould-formed contact areas of the primary and secondary buttons are substantially level with the upper surfaces of the respective additional buttons at all points along the ridge lines 131 and 132 of the additional buttons 129 and 130, respectively, which are contoured such that their fronts jut forth into the mould-formed contact areas partly overlapping middle parts 105c and 106c of the buttons 105 and 106, respectively, to provide sufficient support for the user's index and middle fingertips 12 and 13, respectively. Thus, the pressure from the user's fingertip caused when resting on the mould by mouse moving and flexing the user's finger by actuating the additional button is applied on the contact area of the additional button rather than on the contact area of the primary or secondary button. This allows the user to move the mouse and/or to actuate the additional button by flexing the user's finger without the risk of the undesirable actuation of the primary or secondary button.

Furthermore, the positioning, form, and construction of the buttons of the present embodiments encourage the user to actuate the primary or secondary buttons in a biomechanically convenient way, by stretching the user's index finger or user's middle finger, respectively, in the combined downforwards motion, which can be described as similar to stroking, tangential to, a conventional formed upper surface of the button or in the present embodiment tangential to the contact surface of the additional button in the direction indicated in FIG. 3 by arrow 6. This is a smooth natural motion that does not alter the pointer position as fingertip clicking often does.

A reasonable abstract question may be posed as to how the user will differentiate in the amount and the direction of the finger pressure on the mould or receptacle when pushing the mouse forward and when actuating the primary or secondary button to avoid an undesirable click of the buttons when moving the mouse. It has been determined that the resistance to mouse movement on the working surface is actually insignificant in producing undesirable click instead of producing a forward movement of the mouse. Providing that, there is no significant resistance to mouse movement caused by the weight of the user's hand when being supported by the mouse casing or through interfering the same with the user's palm and/or fingers when operating the mouse.

It is further advantage of the mouse 100 over a conventional mouse that the form of the mouse of the present invention provides a neutral posture of the user's hand on the working surface while at the same time, allows the user to move the mouse in the forward and backward directions on the working surface without the risk of actuating either button by merely stretching or flexing index and/or middle fingers placed in respective fingertip receptacles. The form of the mouse 100 provides sufficient clearance between an upper surface and a rear surface of the casing, and a user's palm, and the user's index and middle fingers when being placed in the respective receptacle when the user manipulates the mouse. During operating the mouse 100 the user's fingers are relaxed and naturally curled, this allows the user to readily differentiate in the amount and the direction of the finger pressure on the mould or receptacle.

Even if the moulds, such moulds 217 and 218 of FIG. 11, are mounted on the surface of the conventional mouse 200 (See FIGS. 11, and 12), the user is able, in short time, to get the right feeling, which allows him/her to move the mouse on the working surface without the risk of the undesirable actuation of the buttons. Note that a conventional mouse designed to support the user's hand should be used by the user with a wrist support, which could provide a sufficient clearance between the user's palm and an upper surface of the mouse when using the same with the moulds 217 and 218 of the present invention being mounted on the buttons of the mouse.

Further possibilities for reducing a risk of undesirable actuating of the primary and secondary buttons during operations are one or more of the following:
- constructing the buttons to retard responsiveness to depressing;
- slightly dulling or deadening the control switches;
- positioning the switches with sufficient clearance between the contacts of the switches and contact surfaces of the buttons;
- designing the button surface to minimize resistance to mouse movement on the working surface; and
- using wireless interfaces.

In FIGS. 7 through 10 several dimensions and locations of interest to the present inventions are illustrated. In the cross-sectional view of FIG. 7 and in the front view of FIG. 9 contact points 153 and 154 represent the lowest points of the contact areas of the index- and the middle fingertips, respectively, and are elevated at the same height from the working surface by a height 181. At the same time, contact points 153 and 154 are located on the front of the ridgelines 131 and 132 of the additional buttons 129 and 130, respectively.

In several embodiments of the present invention with a wheel button, height 181 is minimized and substantially defined by an outside diameter of the wheel button and is within a range of about 2.5 cm to about 1.0 cm. In one embodiment with the wheel button 123, height 181 is 2.0 cm. In several embodiments without a wheel button, height 181 is minimized and substantially defined by the construction of interior components of the mouse, like switches 33, 34, plate 45, buttons 105 and 106, and bottom part 102 and is within a range of about 2.0 cm to about 1.0 cm.

A center of the wheel 123 is disposed a distance 172 of FIG. 7 rearwardly from the front edges 151 and 152 of the moulds 117 and 118, respectively. In embodiments of the invention, distance 172 is about 1.0 cm and about 1.5 cm and in one embodiment is about 1.3 cm. The contact point 155 of FIG. 7 of the user's finger on the wheel 123 is located a height 183 from the contact point 153 and 154. In embodiments of the invention, height 183 is about 0.4 cm and about 0.8 cm and in one embodiment is about 0.6 cm.

Contact points 153 and 154 are located a distance 165 of FIG. 9 from a vertical symmetric axis of the mouse 100. In embodiments of the invention, distance 165 is about 1.4 cm and about 1.7 cm and in one embodiment is about 1.6 cm. As shown in FIGS. 9, and 10, upper casing 101 has a convexo-convex form with a highpoint 159 of FIG. 10, which is a height 180 above the working surface and is a distance 176 from a point 152 of FIG. 10 located on a front edge of the contact area of the mould 118.

In several embodiments of the invention, height 180 is in a range from about 3.9 cm to about 3.3 cm and in one embodiment is 3.7 cm. Distance 176 is about 5.5 cm. Points 151 and 152 of FIGS. 8, 9 located on front edges of the contact areas of the moulds 117, and 118, respectively, are a height 182 (shown in FIG. 9) and are a distance 171 (shown in FIG. 8) from points 153 and 154, respectively.

In several embodiments of the invention, height 182 is in the range from about 1.0 cm to about 0.5 cm and distance 171 is about 0.7 cm; in one embodiment, height 182 is 0.7 cm. Both sides of the bottom part in a thumb-pinching region 158 of FIG. 8 and a ring finger contact area are substantially vertical to the working surface over which the mouse moves. In the top view of FIG. 8 and in the side view of the ring finger side of FIG. 10 are shown several dimensions of the bottom part 102. Widths 160, 161, and 162 of FIG. 8 partially define a concave shape of both sides of the bottom part.

In some embodiments of the invention, width 160 is within a range of about 5.4 cm to about 6.0 cm, width 161 is within a range of about 5.2 cm to about 5.8 cm, and width 162 is within a range of about 6.0 cm to about 6.6 cm. In one embodiment, widths 160, 161, and 162 are about 5.7 cm about, 5.5 cm, and about 6.2 cm, respectively.

In FIG. 10, ridgeline 190 of bottom part 102 and contact point 156 of a user's ring finger are shown. Contact point 156 is located below the ridgeline 190 so that the side of the distal phalanx of the user's ring finger contacts the side of the bottom part 102 while at the same time the user's ring fingertip rests on the working surface. Contact point 156 is located a distance 174 from a point 152 and is elevated at a height 186 from the working surface. In one embodiment, distance 174 is about 2.0 cm and height 186 is about 1.0 cm; and ridge line 190 is at a height 187 of about 2.4 cm, measured at a distance 175 in a thumb pinching region 158 of FIG. 8. Distance 175 is about 4.3 cm.

Figure 8:
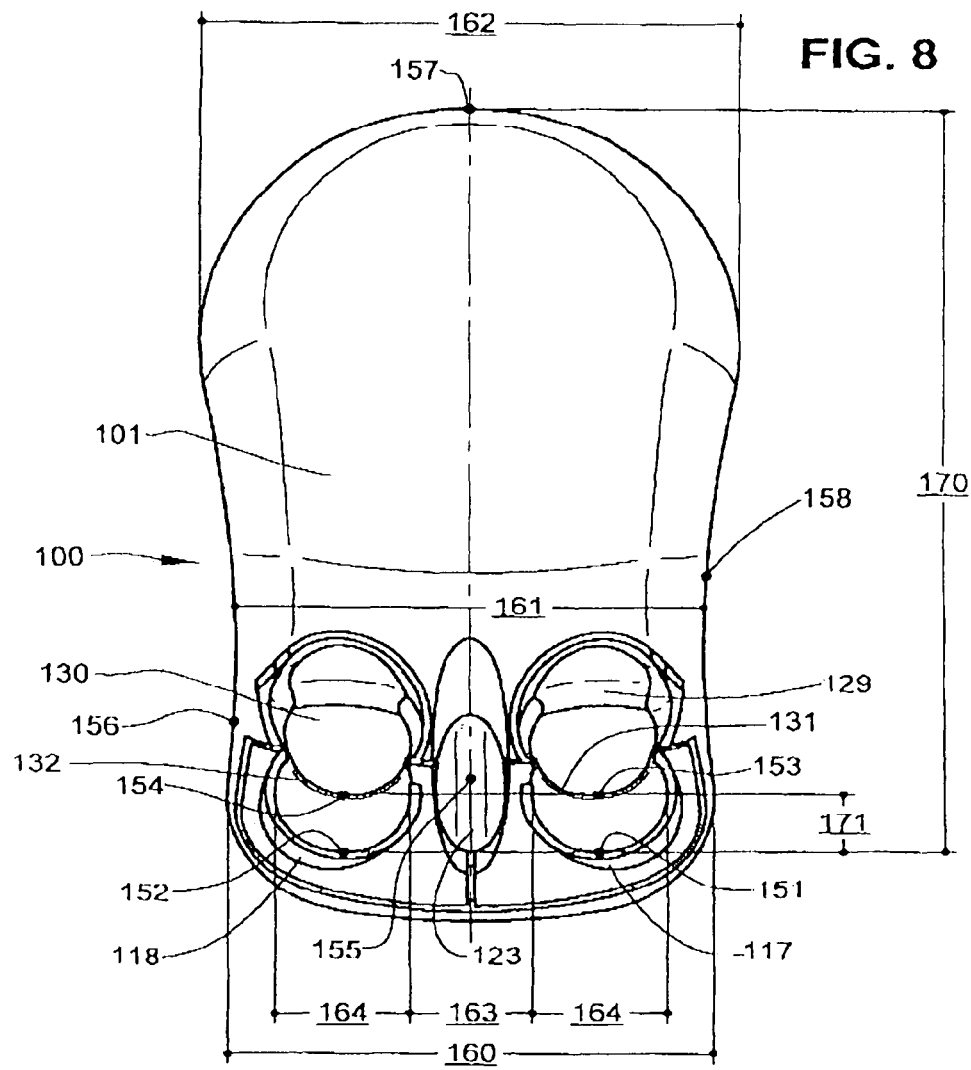
FIG. 8 shows a second top view, partly in phantom and partly in diagrammatic form of a mouse of the present invention.

In FIG. 8, back 157 of mouse 100 is a distance 170 from points 151 and 152 located on front edges of the contact areas of the moulds 117 and 118, respectively, In embodiments of the invention, distance 170 is between about 11.0 cm and about 9.0 cm, and in one embodiment is about 10.5 cm. Point 167 of FIG. 10 indicates position of the sensor of the mouse movement system (not shown in FIGS.) and is located on the bottom surface of the bottom part 102 rearwardly from the contact points 151 and 152 of the primary and secondary receptacles at a distance 177 along a central longitudinal axis of the casing. In embodiments of the invention, the distance 177 is between about 2.0 cm and about 8.0 cm, and in one embodiment is about 5.5 cm.

Although the present invention has been described with reference to particular embodiments, workers skilled in the art will recognize that changes may be made in form and detail without departing from the spirit and the scope of the invention.

The invention claimed is:

1. A mouse for a computer system, said mouse capable of entering commands into a computer based on the location of a cursor which can be placed on a computer screen, when moving said mouse across a working surface, and being actuatable by a user to generate a signal to said computer, said mouse comprising:
   a casing having a bottom part resting on the working surface and an upper part, said casing longitudinally extending from a front end to a rear end and having transversely spaced sides, which are spaced so that said casing is positioned between distal phalanxes of a user's ring and little fingers, and a distal phalanx of a user's thumb, when a user's lower palm, user's ring and little fingertips, and a side of the distal phalanx of the user's thumb are resting on the working surface without gripping said mouse at a naturally relaxed curled fingers and hand position;
   a primary button disposed at an upper front portion of said casing so as to be actuated by a user's index finger, said primary button having an upper surface, which is angled to the front end of said casing; and
   a primary fingertip receptacle at least partially extending upwardly from said angled upper surface of said primary button and forming a mould around a user's index fingertip, when placed on said angled upper surface of said primary button slightly bent, said mould being tapered upwardly from said angled upper surface of said button at a height, which provides a moulded contact surface with said user's index fingertip, which allows the user to move securely said mouse in a forward or backward direction without actuating said primary button by said index fingertip, when moving said index fingertip forward or backward against said moulded contact surface by stretching or bending said index finger in order to effect vertical movement of a pointer on a computer screen in up- or downward direction, respectively, said primary fingertip receptacle enabling a user to effect horizontal movement of a pointer on a computer screen without the use of hand or arm movement of the user, when turning said casing around its axis in said receptacle, when pushing by a thumb or a little finger of the user against a respective contact area on a respective side of said casing, when operating said mouse, said primary button being actuated without actuating mouse movement by a force applied tangential to said angled upper surface of said primary button by said index fingertip, when stroking by said index fingertip said angled upper surface of said primary button in a combined down-forward motion against said moulded contact surface;

a secondary button disposed transversely of said primary button at an upper front portion of said casing so as to be actuated by a user's middle finger, said secondary button having an upper surface, which is angled to the front end of said casing;

a secondary fingertip receptacle at least partially extending upwardly from said angled upper surface of said secondary button and forming a mould around a user's middle fingertip, when placed on said angled upper surface of said secondary button slightly bent, said mould being tapered upwardly from said angled upper surface of said button at a height, which provides a moulded contact surface with said user's middle fingertip, which allows the user to move securely said mouse in a forward or backward direction without actuating said secondary button by said middle fingertip, when moving said middle fingertip forward or backward against said moulded contact surface by stretching or bending said middle finger in order to effect vertical movement of a pointer on a computer screen in up- or downward direction, respectively, said secondary fingertip receptacle enabling a user to effect horizontal movement of a pointer on a computer screen without the use of hand or arm movement of the user, when turning said casing around its axis in said receptacle, when pushing by a thumb or a little finger of the user against a respective contact area on a respective side of said casing, when operating said mouse, said secondary button being actuated without actuating mouse movement by a force applied tangential to said angled upper surface of said secondary button by said middle fingertip, when stroking by said middle fingertip said angled upper surface of said secondary button in a combined down-forward motion against said moulded contact surface; and a form of a rear part of said casing providing sufficient clearance between an upper surface and a rear surface of said casing, and a user's palm plane, and said user's index and middle fingers being placed in said respective receptacle slightly bent, and a lower palm resting on said working surface, so that said upper surface and said rear surface of said casing do not interfere with said user's palm plane, said lower palm resting on said working surface, and said user's index and middle fingers, when the user manipulates said mouse, said form of said rear part of said casing enabling a user to shift said mouse from a neutral position of said user's index and middle fingers, when placed in said respective receptacle slightly bent, by bending said user's index and middle fingers further into a pocket formed by the user's hand, when a user's lower palm, user's ring and little fingertips, and a side of the distal phalanx of the user's thumb are resting on the working surface without gripping or pinching said mouse at a naturally relaxed curled fingers and hand position, so that said mouse does not interfere with said user's palm lane and said user's lower palm resting on said working surface;

wherein a moulded contact surface is at least partially defined by a second additional button having a middle finger contact area and disposed rearwardly from said secondary receptacle so as to be capable of being actuated by bending the user's middle finger positioned in said secondary receptacle and simultaneously pinching the mouse between a user's thumb and a user's ring and/or little fingertips; and wherein said additional buttons each are supported by planes arranged on respective sides of said casing parallel to said common plane of said casing, said additional buttons each are capable of sliding on a respective plane and thereby allowing the user to actuate said additional buttons each by bending said user's index or middle finger positioned in respective receptacle and simultaneously pinching said mouse between said user's thumb and said user's ring and/or little fingertips.

2. A computer mouse for a computer system, said mouse being capable of entering commands into a computer based on the location of a cursor which can be placed on a computer screen, when moving said mouse across a working surface, wherein said mouse has a casing resting on said working surface, said casing having at least one button disposed at an upper front portion thereof so as to be actuated by a user's finger to generate a signal to said computer, said mouse comprising:

a moulded structure mounted to an angled upper surface of said button, wherein said moulded structure at least partially extends upwardly from said angled upper surface of said button and forms a mould around a user's fingertip, when placed on said angled upper surface of said button slightly bent, said mould being tapered upwardly from said angled upper surface of said button at a height, which provides a moulded contact surface with said user's fingertip, which allows the user to move securely said mouse in a forward or backward direction without actuating said button by said index fingertip, when moving said index fingertip forward or backward against said moulded contact surface by stretching or bending said finger in order to effect vertical movement of a pointer on a computer screen in up- or downward direction, respectively, said moulded structure enabling a user to effect horizontal movement of a pointer on a computer screen without the use of the hand or arm movement of the user, when turning said casing around its axis in said mould, when pushing by a thumb or a little finger of the user against a respective contact area on a respective side of said casing, when operating said mouse, said button being actuated without actuating mouse movement by a force applied along a tangent, which touches said angled upper surface of said button at a touching point of said fingertip with said upper surface of said button, by said fingertip, when stroking by said index fingertip said angled upper surface of said button in a combined down-forward motion against said moulded contact surface.

3. The mouse of claim 2, wherein said casing has two buttons disposed transversely of each other at an upper front portion of said casing so as to be actuated by a user's index or middle finger, said mouse further comprising:

a moulded structure mounted to an angled upper surface of each button, wherein one moulded structure at least partially extends upwardly from an angled upper surface of a primary button and forms a mould around a user's index fingertip, when placed on said angled upper surface of said primary button slightly bent, said mould being tapered upwardly from said angled upper surface of said button at a height, which provides a moulded contact surface with said user's index fingertip and a second moulded structure at least partially extends upwardly from an angled upper surface of a secondary button and forms a mould around a user's middle fingertip, when placed on said angled upper surface of said secondary button slightly bent, said mould being tapered upwardly from said angled upper surface of said button at a height, which provides a moulded contact surface with said user's middle fingertip, said moulded contact surfaces each allowing the user to move securely said mouse in a forward or backward direction without actuating said buttons each by said index or middle fingertip, when moving said index or middle fingertip forward or backward against said respective moulded contact surface by stretching or bending said index or middle finger in order to effect vertical movement of a pointer on a computer screen in up- or downward direction, respectively, said moulded structure enabling a user to effect horizontal movement of a pointer on a computer screen without the use of hand or arm movement of the user, when turning said casing around its axis in said mould, when pushing by user's thumb or little finger against a respective contact area on a respective side of said casing, when operating said mouse, said buttons each being actuated without actuating mouse movement by a force applied along a tangent, which touches said angled upper surface of said button at a touching point of said fingertip with said upper surface of said button, by one of said fingertip, when stroking by said respective fingertip said respective angled upper surface of said respective button in a combined down-forward motion against said respective moulded contact surface.

\* \* \* \* \*